United States Patent
Asai et al.

[11] Patent Number: 6,103,317
[45] Date of Patent: Aug. 15, 2000

[54] WATER SWELLABLE COMPOSITIONS

[75] Inventors: Toshihiro Asai, Nishi-ku, Japan; Brian L. Swanson, deceased, late of Concord, by Patricia A. Swanson, executrix; Stephen E. Tomko, Lyndhurst, both of Ohio; Alan Fernyhough, Liphook; Michael Fryars, Woking, both of United Kingdom

[73] Assignee: Glastic Corporation, Cleveland, Ohio

[21] Appl. No.: 08/952,171

[22] PCT Filed: May 23, 1996

[86] PCT No.: PCT/GB96/01245

§ 371 Date: Feb. 10, 1998

§ 102(e) Date: Feb. 10, 1998

[87] PCT Pub. No.: WO96/37901

PCT Pub. Date: Nov. 28, 1996

[30] Foreign Application Priority Data

May 23, 1995 [GB] United Kingdom .................... 9510418
Apr. 10, 1996 [GB] United Kingdom .................... 9607395

[51] Int. Cl.[7] ................................. C08J 7/04; B05D 3/06; B05D 7/20; C09K 3/10
[52] U.S. Cl. .......................... 427/512; 427/508; 427/513; 427/118; 427/516; 174/107; 174/119 C; 174/121 A; 74/502.5; 106/14.41; 106/14.05; 252/184; 252/174
[58] Field of Search ..................... 252/184, 194; 174/107, 102 C, 119 R, 119 C, 120 R, 121 R, 121 A, 121 SR, 120 C, 110 SR, 121 B; 74/502.5; 106/14.05, 14.41, 33; 523/179, 173; 427/508, 512, 513, 516, 118, 434.6

[56] References Cited

U.S. PATENT DOCUMENTS

| | | | |
|---|---|---|---|
| 4,167,464 | 9/1979 | George | 204/159.23 |
| 4,418,163 | 11/1983 | Murakami et al. | 523/205 |
| 4,966,809 | 10/1990 | Tanaka et al. | 428/323 |
| 5,013,126 | 5/1991 | Hattori et al. | 350/96.23 |
| 5,079,034 | 1/1992 | Miyake et al. | 427/45.1 |
| 5,188,883 | 2/1993 | Rawlyk | 428/189 |
| 5,264,251 | 11/1993 | Geursen et al. | 427/389.9 |
| 5,264,471 | 11/1993 | Chmelir | 524/35 |
| 5,489,469 | 2/1996 | Kobayoshi et al. | 428/283 |
| 5,534,304 | 7/1996 | Geursen et al. | 427/389.9 |
| 5,567,744 | 10/1996 | Nagata et al. | 523/200 |
| 5,614,269 | 3/1997 | Hoskins et al. | 427/512 |
| 5,684,904 | 11/1997 | Bringvier et al. | 385/109 |

*Primary Examiner*—Joseph D. Anthony
*Attorney, Agent, or Firm*—D. Peter Hochberg; William H. Holt

[57] ABSTRACT

The invention provides a water-blocking composite comprising a substrate impregnated with or having a coating of a mixture of a radiation-polymerised compound and a water-swellable compound, and method for production thereof.

8 Claims, 2 Drawing Sheets

WATER SWELLABLE COMPOSITIONS

This invention relates to water swellable materials and radiation cure processes for their preparation. In particular it is concerned with the use of such materials and processes for the preparation of water absorbent or water blocking coatings in a rapid continuous process. A particular application for such materials and processes is in cables to apply water absorbent or blocking coatings to cable components (wires, rods, tubes, strength members, reinforcements etc) in order to block water migration along the cables. Other applications requiring water blocking or absorption can also be amenable to this technology.

Many types of water absorbent or water swellable polymers are known (J. Macromol. Sci. Rev. Macromol. Chem. Phys. C34(4) 1994 pp 607–662). Commercial 'superabsorbent polymers' are available and they have the ability to absorb water or aqueous salt solutions, often in an amount several times their own weight. They are commonly supplied as powders, or as fibres or films. The most common form is powders which are usually incompressible and infusible and so are not ideally suited to application as a direct coating.

Films or fibres may also be prepared in-situ via common coating or spinning techniques which usually involve polymerising hydrophilic monomers in solvents such as water. Similarly they can be applied as coatings to fabrics or other articles by many of the usual water or solvent based coating techniques.

When such coatings or films are prepared in-situ, thermal reaction and/or drying, or removal of water (or other solvent), is required prior to use of such coatings. In addition they are usually very thin. This makes such known technologies unsuitable for producing a coating which is immediately functional via a rapid low cost continuous process and also unsuitable for producing relatively thick coatings which can exhibit greater swelling behaviour.

U.S. Pat. No. 5,204,175 discloses a water absorptive fabric including a layer of a water absorptive polymer whose major components consist of a cross-liked poly (metal salt of acrylic acid) and a water soluble resin.

U.S. Pat. No. 5,278,217 discloses a water absorptive composition comprising a thermoplastic elastomer as a first component, a water absorbent resin as a second component, and a third component which consists of a water soluble resin. This composition is suitably used for producing a water absorptive member for protecting optical fibre elements of an optical cable.

U.S. Pat. No. 5,179,611 discloses an optical fibre cable comprising a water absorptive member claimed in U.S. Pat. No. 5,278,217.

Japan unexamined patent application H2-149808 discloses a water blocking cable having a central tension member covered with a layer of water absorbent thermoplastic material, whereon loose tube type wave guides are mounted twistedly. The water absorbent thermoplastic comprises polyacrylic acid type.

Japan unexamined patent application H2-162307 discloses a water blocking cable having a non-metallic central tension member covered with a layer of water absorbent thermoplastic material, whereon loose tube type wave guides are mounted, whereon tape of water absorbent material is wrapped.

Japan unexamined patent application H3-137607 discloses that, to block water migration in a cable with one or more optical fibres, the outside layer of fibres comprise UV polymerised polymer that swells when exposed to water. Acrylic type, polyethylene oxide UV resin, polyvinyl alcohol type UV resin are preferably used as UV polymerisable resin, but no further details are given.

U.S. Pat. Nos. 4,167,464 and 4,486,489 describe the use of photopolymerisation methods to prepare water absorbent films or fibres in situ from aqueous formulations comprising pre-formed acrylic acid salts as the main component. Since large amounts of water are present in the formulations the speed of the acrylate polymerisation is reduced and this can leave films which are very soft and/or which have a high level of residual tack if the systems are under-cured by insufficient exposure to the UV radiation and/or post-heating. Indeed there may be relatively higher residual unreacted monomers if not fully cured. In addition such films, after cure, contain relatively high residual water which can be regarded as undesirable per se eg in cables. If drier films are needed from the above formulations, additional heating (drying) is stated as being necessary and this is an obvious inconvenience. The use of high water contents in the formulation can also impair the ability to coat or adhere to some substrates.

U.S. Pat. No. 5,388,175 discloses an optical waveguide cable with water absorbent powder embedded therein.

EP-A-0-685 855 discloses a water blocking composite for use in cables based on a coating of a molten thermoplastic resin and a water swellable material.

EP-A-0 482 703 reports on an oil-in-water emulsion method for coating aramid yarns with a requirement for subsequent evaporation of solvent(s).

The present invention provides a water-blocking composite comprising a substrate impregnated with or having a coating of a mixture of a radiation-polymerised compound and a water-swellable compound.

This invention also provides a method of preparing a water-blocking composite, which comprises impregnating or coating a substrate with a composition comprising a water-swellable compound dissolved or dispersed in a monomer and/or oligomer having radiation-polymerisable functionality; and exposing the resulting impregnated or coated substrate to radiation to effect curing of the composition.

The invention further provides a radiation-curable composition for forming a water-blocking composite with a substrate, the composition comprising a water-swellable compound dissolved or dispersed in a monomer and/or oligomer having radiation-polymerisable functionality.

The water-swellable properties of the coating result directly from the presence of the water-swellable compound, which is preferably a superabsorbent polymer, although there may also be some contributions from other components.

The present invention provides a route to forming water swellable films or coatings in a rapid on-line continuous process based on radiation curing. The invention makes it possible to coat fibres (eg glass fibres; yarns; optical fibres), wires, or rods (eg cable tension members) or tubes (eg polymeric cable jackets or buffer tubes) or other articles in a rapid continuous process in which no solvents or water are required and where heat is not essential for melting or for inducing reactions. The process can, for example, be part of a cabling or jacketing process or part of a rod or fibre making process and be capable of operating at the rapid line speeds commonly used in such processes.

Since there are not large amounts of solvents or water present there is no special requirement to dry the coatings or films after their formation. As well as thin coatings, relatively thick coatings are also formable. The films or coatings are functional with immediate effect and ready for any subsequent processing stage required in the overall manufacturing process for the end application. Furthermore their characteristics do not change substantially as a result of evaporation of solvent or water on standing or after drying.

Despite the absence of solvents the radiation curable components can usually be of low viscosity at moderate temperatures (often below 100° C.) and this allows relatively high loadings of superabsorbent polymer (and other additives) within the compositions, whilst retaining easy processability.

In summary, the advantages of our invention:

rapid, convenient, and cost efficient continuous production of a water absorbent or water blocking coating or composite;

the process is flexible and adaptable to fit in with other stages in a continuous production line (ie line speeds can be easily varied to accommodate overall production variations) eg it can be part of a cable or wire or fibre or extrusion or pultrusion or UV-pultrusion line;

the coating is immediately functional and handleable (eg no post-heating or drying);

the coating contains zero or a relatively low amount of water or residual volatile solvent;

relatively high loadings of superabsorbent polymer can be included at convenient low-moderate temperatures;

the coating has good wetting on and adhesion to, many surfaces.

In one embodiment, this invention aims to block water migration inside a fibre optic cable. This composition has superiority to conventional technology in cables in terms of:
1. Swelling speed (quick swell).
2. Swelling ratio (large expansion).
3. Efficiency and flexibility of the process—fast curing/processing and low cost coating process suitable for an on-line, in-situ coating or composite manufacture without the need for post heating/drying stages.
4. Coatability on components in a cable.
5. Stability during cable manufacture, such as extrusion of upjackets or of the cable.
6. No messy or inconvenient greases are used and powders are not loose or free but contained with a matrix.

An object of the present invention is to provide a radiation curable composition which after cure can exhibit water absorbing and water swelling properties. A particular object of the invention is to provide a radiation curable composition which after cure, on exposure to water or an aqueous solution, can swell with the effect of blocking further ingress of water.

The components of the radiation-curable composition may be used within a wide range of relative proportions and comprise:

one or more mono- or multi- functional monomer(s) or oligomer(s) with radiation polymerisable functionality;
photoinitiator;
superabsorbent polymer;
and optionally one or more of the following:
other polymer which is soluble or dispersible in the liquid components of the composition;
an inorganic salt;
a base;
a small amount of water or organic solvent;
a blowing agent or foaming agent;
a surfactant or dispersant;
an adhesion promoter or tackifying resin;
a fibre or filler.

Other possible additives include coupling agents, air release agents, wetting agents, lubricants or waxes, inhibitors, stabilisers, antioxidants and pigments.

The final compositions of desirable formulations will depend on a number of factors including the required processing speed, coating thickness, water swelling or blocking response in terms of speed and extent, the nature of the surfaces to which the coating is to be applied, and the nature of solutions in which it is required to function (ie absorb).

The radiation polymerisable component(s) may be hydrophobic or hydrophilic or any gradation in between, and is preferably selected from groups consisting of:

mono or multi-functional acrylates which are photopolymerisable via a radical mechanism; or mono- or multi- functional vinyl ethers or epoxides which are photopolymerisable via a cationic mechanism.

Although acrylate based systems are preferred for the most rapid processing requirements, other radical reactive systems which are amenable to radiation initiated polymerisation are also suitable if slower processing speeds can be utilised for the end application. Thus, methacrylate (vinyl ester) or styrenic or vinyl ether—maleate or other unsaturated polymerisable systems may be used. Addition of acrylate functionality to such systems, can be used to accelerate their processing.

Examples of radiation polymerisable acrylates that may be used include all commercial mono- and multi- functional acrylates. The range of useful acrylate monomers or oligomers is thus broad and includes aliphatic and cycloaliphatic acrylates, aromatic hydrocarbon acrylates, heterocyclic acrylates, epoxy acrylates, polyether acrylates, polyester acrylates, urethane acrylates, silicone acrylates, metallic acrylates, melamine acrylates, amino acrylates and other functional acrylates. Other radiation polymerisable materials such as N-vinyl pyrrolidone or N-vinyl acetamide or acrylamides may also be used.

Cationically polymerisable systems, such as vinyl ether or epoxy functional materials, may also be used in place of acrylate radical polymerisation systems. Cationically polymerisable monomers or oligomers such as vinyl ethers or epoxy functional materials, together with hydroxy functional co-reactants (eg diols or triols) may also be used. Examples are mono- and multi- functional vinyl ethers or epoxides such as the glycidyl ethers of alcohols, diols, bisphenols, polyols and polyphenols, polyalkylene oxides and epoxidised olefins, epoxidised cyclic olefins, together with, if desired, hydroxy functional polyols and/or other epoxy functional materials. Other additives such as those mentioned above and below (polymers, surfactants, salts etc) can all be included also, although the addition of bases is not always recommended because it may interfere with the cationic polymerisation.

In all cases (radical and cationic systems) the radiation curable components may be polymerised on exposure to the radiation to form either highly crosslinked structures (ie containing only, or high proportions of, multifunctional monomers or oligomers), or lightly crosslinked polymer structures, or structures without crosslinking (ie containing only monofunctional monomers).

When the composition includes radiation polymerisable hydrophilic component(s) they may be preferably selected from groups consisting of:

mono or multi-functional acrylate having mono- or multi-carboxylic acid or sulphonic acid functionality eg acrylic acid, β-carboxy ethyl acrylate (β-CEA), maleic or fumaric acid (or anhydrides), acrylamidosulphonic acid.

salts of the acid functional acrylates with sodium, potassium or ammonium as the counter-ion eg sodium acrylate, ammonium acrylate, sodium salt of acrylamido sulphonic acid, sodium 2-sulphoethoxy acrylate. Also salts of these acids with other amines such as triethylamine, methyl morpholine, hydroxyethyldiethylamine, triethanolamine, hydroxyethyl morpholine.

mono or multi functional acrylate having mono or multi hydroxy functional group(s) eg. hydroxy ethyl acrylate, hydroxy propyl acrylate; glycerol mono and multi acrylates; trimethylolpropane mono and multi-acrylates, acrylated epoxides eg Ebecryl III;

mono or multi functional acrylamides eg N-hydroxymethylacrylamide, N-alkyl or N-alkoxy substituted acrylamides mono or multi acrylate having alkoxylated chains eg ethoxy or poly ethylene oxide structure e.g. polyethylene glycol diacrylate (eg SR 344 from Sartomer), polypropylene glycol diacrylate, ethoxy ethoxyethyl acrylate (EOEOEA), polypropylene oxide monoacrylate (SR 607 from Sartomer), ethoxylated phenoxy ethyl acrylate, monomethoxy neopentyl glycol propoxylate monoacrylate (Photomer 8127 from Henkel);

amino-acrylate or amine-acrylate salt, eg N,N-dimethylaminoethyl acrylate (DMAEA); hydrochloride or toluene sulphonate or other salt of DMAEA;

metal acrylate e.g. sodium acrylate or zinc diacrylate;

acryloxy sulphonate salt e.g. sodium 2-sulphoethoxy acrylate;

other monomer and oligomer which are hydrophilic or water soluble e.g. N-vinyl 2-pyrrolidone, N-vinyl caprolactam, vinyl acetate, tetrahydrofuryl acrylate, acryloxy silane coupling agent, hydrophilic urethane acrylate, polyether acrylate, epoxy acrylate and polyester acrylate.

One or more photoinitiators and/or photosensitisers are preferably selected from the groups below, depending on the type of polymerisation.

For free radical reaction of acrylate by UV radiation or visible light radiation examples include:

acetophenone type e.g. 2-hydroxy-2-methyl-1-phenyl-propan-1-one (Darocure 1173)

acylphosphine oxide e.g. Irgacure 1800)

benzophenone type benzoin type e.g. benzil dimethyl ketal (Irgacure 651)

thioxanthone type e.g. isopropylthioxanthone (ITX)

other sensitiser and co-initiator for UV and visible light curing e.g. triethanolamine other amine-alcohols, Michler's Ketone, eosin.

For the cationic photoinitiation of vinyl ether or epoxy system example photoinitiators are aryl diazonium salts or aryl sulphonium salt eg UVI-6974 and aryl metal complexes such as Ciba CG24-061.

A photoinitiator is not necessary for Electron Beam radiation curing of radical systems.

The water swellable compound may be inorganic (e.g. certain bentonites) or it may be a superabsorbent polymer. A superabsorbent polymer is preferred.

The superabsorbent polymer, which may be a powder or fibre or other form, is preferably selected from groups such as:

crosslinked polyacrylates including polyacrylic acids and their fully or partially neutralised derivatives such as cross-linked sodium polyacrylate; copolymers or terpolymers of acrylic acid and/or its salts such as sodium acrylate with acrylamide and/or other carboxy acid or sulphonic acid or hydroxy- or amino-functional monomers;

cross-linked polyethylene oxide based polymers;

cellulosic polymers and graft polymers based on cellulosic polymers such as cross-linked sodium carboxymethyl cellulose; sodium acrylate grafted starch;

co- and ter- polymers based on acrylamides and/or acrylonitriles;

polyvinyl alcohols and related copolymers;

poly vinyl ethers and related co- and ter- polymers;

polymaleic anhydride and copolymers of maleic anhydride;

other type of commercial superabsorbent polymer.

Preferred compositions comprise:

20~98% wt. of the first component (radiation polymerisable monomer/oligomer or mixture of such mono- and multi-functional monomers and oligomers);

0.1~10.0% wt. of the second component (photoinitiator);

2~80% wt. of the third component (superabsorbent polymer).

The swelling response of the cured coating in water can be accelerated by incorporation of surfactants, blowing agents and/or other added polymers or fillers or fibres or other additives.

Addition of surfactant up to 50%, preferably 2 to 50% of the total composition weight (more preferably 2 to 50% of the radiation curable components) can be particularly advantageous in some systems and can significantly increase the swell response. Example surfactants which can be used with or without water can be non-ionic, eg alkoxylated amines, alcohols, esters, oils, fatty acids, nonylphenol and ethanolamides and sorbitan esters, alkyl aryl polyether alcohols eg Triton X100 (from Rohm & Haas), or anionic or cationic, or amphoteric. Surfactants can help to stabilise some systems also containing other dispersed materials eg fillers, salt or base. The effectiveness of the added surfactant can be enhanced by pre-mixing with the filler, salt or superabsorbent.

Addition of blowing agent that can generate gas when contacted with water or on heating (eg during exposure to UV lamp which usually imparts some heating effect and also produces some consequential heat of polymerisation) can also increase the swell response.

Examples are sodium bicarbonate, sodium carbonate, ammonium carbonate, ammonium bicarbonate with or without organic or inorganic acid (eg acetic acid, citric acid, oxalic acid, tartaric acid or keto-acid, or hydroxy acids such as lactic acid, etc), or $NaAl(SO_4)_2$, $KAl(SO_4)_2$, $NaH_2PO_4$ or $NaBH_4$; or $C_6N_6$, $BaN_6$, azo compounds such as azodicarbonamide etc. It will be seen that some of those blowing agents such as carbonates, hydrogen carbonates and some phosphate derivatives may usefully act both as blowing agent and base in certain formulations. Here the avoidance of excessive heat build up at the mixing stage (eg gradual addition) is required to avoid premature activation of the blowing agent effect in such systems.

To improve the coatability on a substrate, resins, polymers and fillers may be added.

Addition of adhesion promoter or tackifying resin can help the coating to adhere stronger to certain substrates.

Use of di- or multi- functional acrylate helps the coating to cure faster.

Use of longer chain flexible acrylate helps the coating to become flexible.

The radiation curable composition can be prepared in the following manner:

The first component(s) radiation polymerisable components) and second component (photoinitiator) are mixed in a suitable proportion as above by using an open mixer or stirrer or kneader under, if required, slight heating (eg 40–80° C.) to dissolve the second component easily. Other liquid materials can then be added if necessary and then the third component (superabsorbent polymer) can be added and dispersed or dissolved in the system.

When a surfactant is included this may, if desired, be pre-mixed with the superabsorbent polymer (component 3) prior to addition to the other components. In some systems this leads to improved performance of the cured coating.

Examples of useful added polymers are those that are soluble or dispersible in the formulations. These include:

poly(ethylene oxides) such as 'Polyox' and 'Carbowax' (Union Carbide) and other polyalkylene oxides;

poly(vinylpyrrolidone) (PVP) polymers and copolymers of vinyl pyrrolidone (such as those available from ISP) e.g. Acrylidone, poly(vinyl alcohol) and copolymers;

vinyl acetate polymers and copolymers;

acrylic polymers and copolymers;

polystyrene and its copolymers;

poly(vinyl ethers) eg poly(vinyl methyl ether) and copolymers of vinyl ethers e.g. Gantrez copolymers from ISP.

poly(acrylic acid) and copolymers/derivatives;

poly(acrylamide) and copolymers;

copolymers or terpolymers of ethylene or propylene with acrylic acid or acrylic acid esters or vinyl acetate or maleic anhydride and ester or half ester derivatives;

polymaleic anhydride and copolymers of maleic anhydride and ester or half ester derivatives;

polyethylene imine and other polyamines including poly (vinyl-pyridine)s and their copolymers;

starches or celluloses and related structures;

isonomers.

Examples of bases that can be added include hydroxides, alkoxides, carbamates, carbonates and hydrogen carbonates, di and tri- basic phosphates or citrates, of ammonium and of Group I and II metals including sodium, potassium, magnesium, and calcium. Organic bases such as amines eg triethanolamine or triethylamine or morpholines or piperidines can also be used.

Examples of added salts that may be used include halides, acetates, carboxylated and phosphates of metals and ammonium.

Examples of solvents which may be added include alcohols, glycols, polyols, ethers and alkoxylated solvents. Examples include ethanol, methanol, isopropanol, ethylene glycol, propylene glycol, polyalkylene oxides, glycerol, trimethylolpropane, alkoxylated derivatives and ethers of the above (e.g. Photonols from Henkel). Levels of added solvents, if used, are preferably lower than 25% by weight of the total composition.

Addition of fillers such as inorganic particles (e.g. fumed silica, mica) or polymer powders or fibres (e.g. polyethylene powder) may increase swelling response in certain systems.

Addition of fibres or surface treated fibres can help to increase swell response in certain formulations. Examples include ground cellulosic fibres, polyvinyl alcohol fibre, polyolefin fibres, and glass fibre.

Addition of fine particles of inorganic salt may increase swell response in some cases eg $CaSO_4$, ammonium acetate ($NH_4Ac$), bentonite and water absorbing inorganic materials etc.

Use of monomer or oligomer with radiation polymerisation functionality and also containing carboxylic or sulphonic acid, or hydroxyl or amino or urethane structure may help to increase adherability to certain substrates. Examples are aliphatic or aromatic urethane acrylate, succinic acid acrylate, acrylic acid or carboxy ethyl acrylate, and dimethylamino ethyl acrylate.

Addition of oligomer with radiation polymerisation functionality also containing phosphoric acid/ester may also help to increase adherability to certain substrates. Examples are phosphoric acid diacrylate and hydroxymethyl-methacrylate-phosphate.

The composition used in the invention has a suitable viscosity range to be coated at suitable thickness on cable component materials such as central tension member, wave guide, tape, fibre reinforcement, etc. by means of common coating methods such as roll coater, bath dipping, coating die, extrusion coating die, which is placed together with radiation curing equipment. This coating process can be part of a continuous cable, wire, fibre or other continuous manufacturing line.

This composition can be polymerized by radiation such as UV radiation or visible light or electron beam (EB), at suitable curing speed that can meet the economical production speed of cable and other continuous manufacturing processes. Since the compositions do not always need to be heated to high temperatures for coating and curing, no special cooling is usually required. Thus, the coating and UV or light curing or EB system is relatively compact with easy handling and involves relatively low capital expense. In some cases some heating (eg in a resin bath) may be used to achieve a suitable viscosity for the application of the coating.

Furthermore, since this composition is quick curing by radiation, the coating/curing system can be synchronized to cable and other continuous manufacturing condition variations and this leads to the benefits of low maintenance and high productivity.

The compositions can be coated and cured on cable components (wave guide, tension member, buffer tube, wrappings, tapes etc.) at a range of thickness of 0.001" up to 0.5". The compositions can have a range of swell response times from a few seconds to minutes after it comes into contact with water. This coating (cured composition) can swell, for example, in excess of double the original thickness and often, if constraints allow, much more than this. These benefits given cable designs additional flexibility to reduce the space in a cable where water can migrate to and so reduces or eliminates the need to fill spaces with other water blocking materials such as tapes, wrappings, powder etc. This leads to a water proof cable system with less cost, easy installation and maintenance (no grease, no loose powder).

Figure 1:
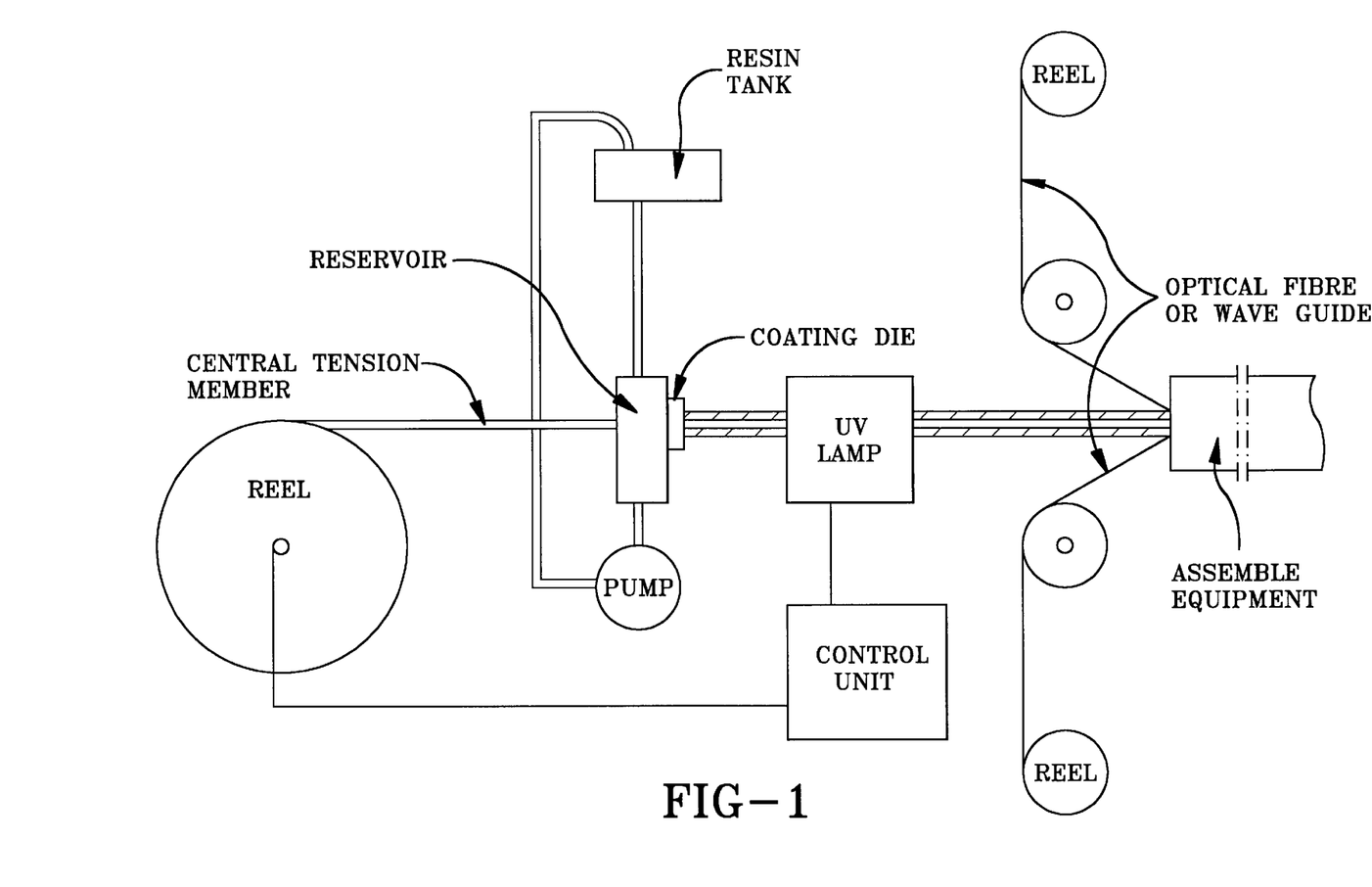
FIG. 1 illustrates a coating and radiation curing system according to the invention.

The coating and radiation curing system can be built either within the cable or other continuous manufacturing line, or it may be off line as a separate process. A typical system is illustrated in FIG. 1. This system consists of a reservoir having coating die and a tank of radiation curable composition, a pump unit, a UV radiation unit and a control unit. The UV radiation unit can, for example, use one or more UV lamp(s) of 100 to 800 WATT per inch energy depending on cure condition required by cable production speed and coating condition. The cable component(s) are/is coated and radiation cured with the composition then passed to the cable assembly unit. Alternatively, the coated components can be stored and used at a later date for cable assembly.

EXAMPLES

Tests used to characterise materials include observation of viscosities (for suitability to coat), cure efficiency (observation of whether a 10 mil thick coating was cured after 1 pass under a 300 W UV lamp with a conveyor at a constant speed of about 13 m/min—setting D5 on the conveyor), and observation of swelling response (time to observation of completion of swelling absorption) of cured films on exposure to water.

In the tests used for Tables 1–3 the 'time to finish swelling' is the time observed for a drop of water—which is placed onto the coating—to disappear via absorption within and expansion of the coating. A drop of water is placed onto the cured coating and by a process of absorption and swelling the water drop becomes part of the coating which expands to engulf or enclose it. It is not simple absorption of the water—the coatings expand as the water is absorbed/disappears. The time for this process to be completed (after addition of the water drop) such that the water is not longer observed as a separate entity on the coating is recorded.

In practical applications it will be recognised that there will be a balance between various factors (eg viscosity and required coating thickness, swell response, cure speed, adhesion to substrate, tackiness of coating) which will dictate which formulations are most appropriate.

All the examples given exhibit useful viscosities at temperatures below 100 C. and most exhibited very good cure speeds for most envisaged applications.

Examples of compositions are shown in Tables 1, 2 and 3 (in relative weights) and results of evaluations are also shown. These results indicate compositions based on this invention exhibit an excellent balance of cure efficiency and quick swell response as well as a suitable range of viscosities.

TABLE 1

Examples

| Ref | PI KB-1 | SAP J440NF | SAP % | TPGDA | PEGDA | HDDA | E0-TMPTA | EA-HDDA | Surfactant X-100 | Visc of Mix | Cure Test 300W @ D5 ~10 MIL | Water Swell Test Time to finish swell after water is dropped on |
|---|---|---|---|---|---|---|---|---|---|---|---|---|
| 201-1 | 0.15 | 5 | 33 | 10 | | | | | | lower | cured | >15 mins |
| 201-2 | 0.15 | 5 | 33 | | 10 | | | | | " | cured | ~30 sec |
| 201-3 | " | " | " | | | 10 | | | | " | cured | >10 mins |
| 201-5 | " | " | " | | | | 50 | | | " | cured | ~5 mins |
| 206-1 | 0.15 | 5 | 33 | 9.5 | | | | | 0.5 | lower | cured | ~20 sec |
| 206-2 | " | " | " | 9 | | | | | 1 | " | " | 17–20 sec |
| 206-3 | " | " | " | 8 | | | | | 2 | " | " | 12–15 sec |
| 206-5 | " | " | " | | | 9.5 | | | 0.5 | " | " | 2.5–3.5 min |
| 206-6 | " | " | " | | | 9 | | | 1 | " | " | 2.5–3.5 min |
| 206-7 | " | " | " | | | 8 | | | 2 | " | " | 2.5–4.0 min |
| 206-8 | 0.15 | " | " | | | | | 10 | 0 | thicker | cured hard | >10 min |
| 206-9 | 0.15 | " | " | | | | | 8 | 2 | " | " | 20–30 sec |
| 206-10 | 0.15 | " | " | | | | | 8 | 2 | " | " | 10–20 sec |

TABLE 2

Further Examples

| Ref | PI KB-1 | SAP 550P | SAP % | Surfactant X100 | PEA | HDDA | ACT 800 | Fumed silica | Visc. Of Mix | Cure Test 300W @ D5 ~10 MIL | Water Swell Test Time to finish swell after a water is dropped on |
|---|---|---|---|---|---|---|---|---|---|---|---|
| 227-7 | 0.15 | 5 | 33 | 0 | 10 | 0 | | | low | cure | 4–5 sec |
| 227-8 | " | " | " | 2 | 8 | 0 | | | " | " | 2–3 sec |
| 227-9 | " | " | " | " | 5 | 3 | | | " | " | 2 sec |
| 227-10 | " | " | " | " | 7 | 1 | | | " | " | 2 sec |
| 227-11 | " | " | " | " | 7.5 | 0.5 | | | " | " | 2 sec |
| 228-12 | " | " | " | " | 3 | 5 | | | " | " | 10 sec |
| 225-13 | " | " | " | " | 0 | 8 | | | " | " | 18–19 sec |
| 225-14 | " | " | " | " | 0 | 10 | | | " | " | 8–10 sec |
| 225-15 | " | " | " | " | 3 | 5 | | 0.14 | high | " | 4–5 sec |

(*1)

TABLE 2-continued

Further Examples

| Ref | PI KB-1 | SAP 550P | SAP % | Surfactant X100 | PEA | HDDA | ACT 800 | Fumed silica | Visc. Of Mix | Cure Test 300W @ D5 ~10 MIL | Water Swell Test Time to finish swell after a water is dropped on |
|---|---|---|---|---|---|---|---|---|---|---|---|
| 225-16 | " | " | " | 2 | 3 | 5 | | 0.14 (*2) | high | " | 10–12 sec |
| M321-3 | 0.15 | 5 | " | 2 | 3 | | 5 | | " | " | 14–16 sec |

(*1); Mixed with SAP
(*2); Mixed with resins

TABLE 3

Further Examples

| Ref | PI KB-1 | SAP J440NF | SAP 550P | SAP % | Surfactant X100 | EA-HDDA | UA-IBOA | Visc. Of Mix. | Cure Test 300W @ D5 | Water Swell Test Time to finish swell after a water is dropped on |
|---|---|---|---|---|---|---|---|---|---|---|
| 226-1 | 0.15 | 5 | | 33 | 2 | 8 | | High | Cure | 24–28 sec |
| 226-2 | " | | 5 | " | " | 8 | | " | " | 23–33 sec |
| 226-5 | " | 5 | | " | " | | 8 | High | " | 25–29 sec |
| 226-6 | " | | 5 | " | " | | 8 | High | " | 11–15 sec |
| 227-1 | 0.15 | 0 | 5 | 33 | 0 | 10 | | High | Cure | 2 mins |
| 227-2 | " | " | " | " | 0.2 | 9.8 | | " | " | 1 min 30 sec |
| 227-3 | " | " | " | " | 0.5 | 9.5 | | " | " | 25 sec |
| 227-4 | " | " | " | " | 1 | 9 | | " | " | 17 sec |
| 227-5 | " | " | " | " | 2 | 8 | | " | " | 15 sec |
| 227-6 | " | " | " | " | 3 | 7 | | " | " | 19–20 sec |

NOTES TO TABLES 1–3

PI=Photoinitiator; KB-1=Esacure KB-1 from Lamberti SPA.
SAP J44ONF and SAP 55OP are commercial superabsorbent powders available from Sumitomo Seika Chemicals (Aqua Keep).
Surfactant X-100=Triton X-100. Unless otherwise stated this was pre-mixed with the SAP powder.
PEA=Phenoxy ethyl acrylate.
HDDA=Hexanediol diacrylate.
EO-TMPTA=Ethoxylated trimethylolpropanetriacrylate (eg SR 454 from Sartomer Co).
EA-HDDA=Mixture of bisphenol-A epoxy acrylate oligomer and HDDA.
UA-IBOA=Urethane acrylate oligomer—isobornyl acrylate mixture.
TPGDA=Tripropylene glycol diacrylate.
ACT 800=Silicone acrylate oligomer from Ackros (Actilane 800)
PEGDA=Polyethylene glycol diacrylate.
"=as above

ADDITIONAL TESTS

1. Coated Rods

Figure 2:
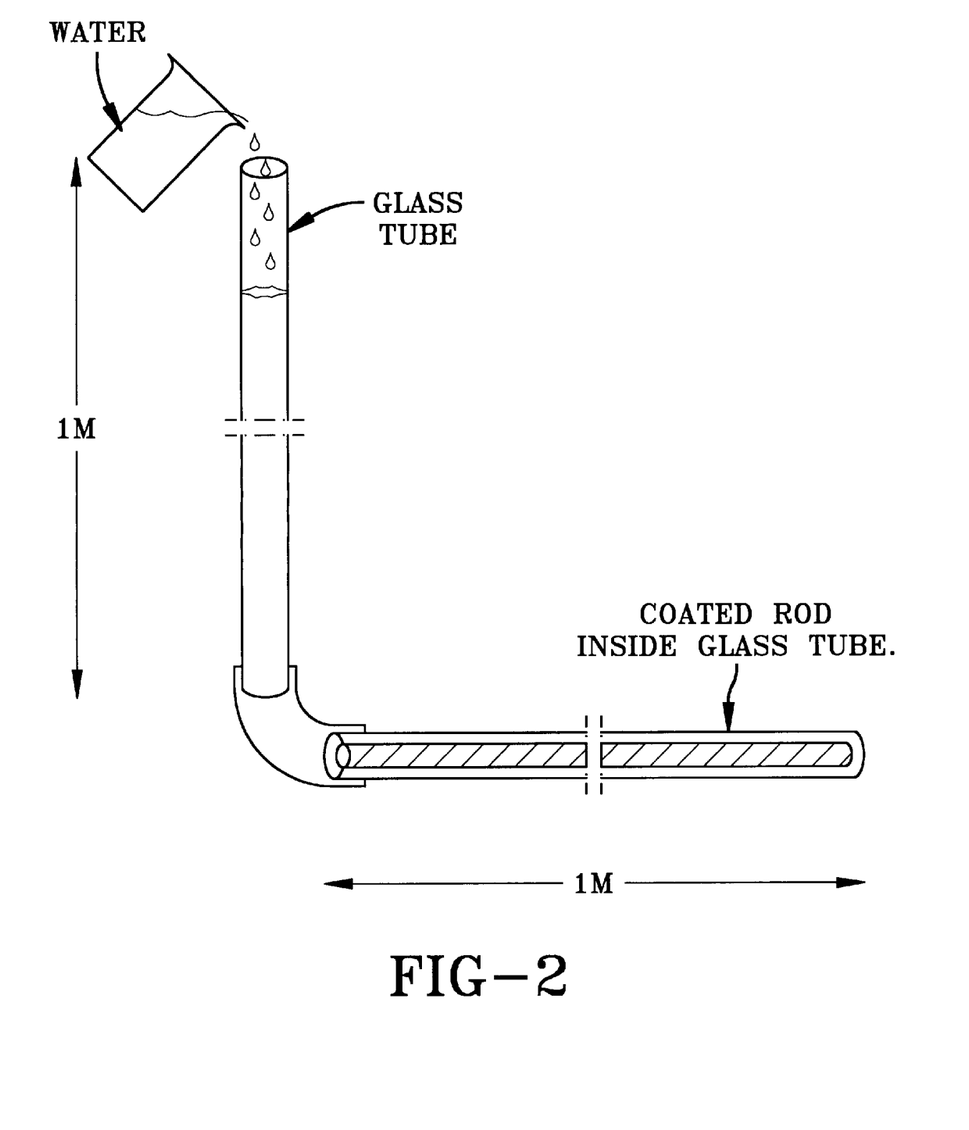
FIG. 2 illustrates a cured coated rod according to the invention which is subsequently inserted into a glass tube.

Three compositions were further evaluated in a 'tube blocking test' whereby a 1 m long glass fibre reinforced composite rod of about 2.3 mm diameter was coated with these formulations via a UV process which involved dipping the rod in a bath containing the formulation, pulling through a die of about 2.6 mm internal diameter and UV curing to produce a coated rod. This cured coated rod is then inserted into a 1 m long glass tube of internal diameter 3.4 mm and arranged as in FIG. 2. Water from a reservoir is allowed to flow freely into this tube with coated rod insert and the time for the flow of water down the length of the rod to be blocked is recorded. The length of coated rod which came into contact with the water front before flow ceased is also recorded. A test similar to this is sometimes used by cable companies to assess water blocking ability. The results quoted below (as averages of three measurements for each), indicate good blocking performance.

| COMPOSITION* | TIME TO BLOCK | LENGTH TO BLOCK (cm) |
|---|---|---|
| TPGDA/SAP/X100/KB1 (52.8/33/13.2/0.15) | 6–7 s | 87 |
| HDDA/PEA/SAP/X100/KB1 (33/19.8/33/13.2/0.15) | 6–7 s | 89 |
| ACT800/PEA/SAP/X100/KB1 (33/19.8/33/13.2/0.15) | 6–7 s | 90 |

SAP = J440NF, premixed with X100.

2. Fibre Reinforced Composite Rods

The same three compositions were used to prepare a glass reinforced composite rod by a UV pultrusion process which involves impregnating continuous glass fibres in a resin bath containing the formulation, passing the wetted fibres through a die (1.9 mm diameter) and UV curing to produce a cured composite rod with an approximate fibre content of around 28 wt %.

When these glass fibre reinforced rods are inserted into 4 mm (internal diameter) glass tubes and evaluated in tube blocking tests as above, the following data was obtained.

| COMPOSITION | TIME TO BLOCK |
|---|---|
| TPGDA/SAP/X100/KB1 | 1–2 mins |
| HDDA/PEA/SAP/X100/KB1 | 4–6 mins |
| ACT800/PEA/SAP/KB1 | 1–2 mins* |

*40–50 s when inserted into a 3.4 mm diameter glass tube.

Although blocking lengths in these particular examples were greater than the 1 m length of glass tube it was still possible to record a blocking time when the flow of water ceased.

What is claimed is:

1. A method of preparing a water-blocking composite, which comprises applying to a component of a cable, a composition comprising a water-swellable compound dissolved or dispersed in a monomer and/or oligomer having a radiation-polymerisable functionality; and exposing the resulting impregnated or coated component of a cable to radiation to effect curing of the composition.

2. A method according to claim 1, wherein the step of applying a composition to a component of a cable, comprises coating said composition on the component of the cable.

3. A method according to claim 1, in which the water-swellable compound is a superabsorbent polymer.

4. A method according to claim 1, in which the composition also contains at least one photoinitiator and/or photosensitizer suitable to promote polymerization of the monomer or oligomer.

5. A method according to claim 1, in which the radiation is UV radiation.

6. A method according to claim 1, in which the component of a cable is selected from the group consisting of continuous fibre, metal, plastic or fibre reinforced plastic rod, wire and sheet.

7. A method according to claim 6 in which the continuous fiber is selected from the group consisting of filaments, tow, yarn, ribbon, mat, and tape.

8. A method according to claim 1 in which the component of a cable is selected from the group consisting of a strength member, a buffer tube, a wrapping, a tape, and a ribbon.

* * * * *

UNITED STATES PATENT AND TRADEMARK OFFICE
CERTIFICATE OF CORRECTION

PATENT NO.    : 6,103,317
DATED         : August 15, 2000
INVENTOR(S)   : Asai et al.

It is certified that error appears in the above-identified patent and that said Letters Patent is hereby corrected as shown below:

<u>Title page,</u>
Item [56], References Cited, please add:
-- FOREIGN PATENT DOCUMENTS
| | | | |
|---|---|---|---|
| 91 03 2129 | 12/1990 | Japan | AN97 |
| 90 144362 | 03/30/90 | Japan | A 96 |
| 1271434 | 10/30/89 | Japan | |
| 0353775 | 02/07/90 | Europe | G02B 6/44 --. |

Signed and Sealed this

Eighth Day of November, 2005

JON W. DUDAS
*Director of the United States Patent and Trademark Office*